United States Patent [19]

Wu et al.

[11] Patent Number: 6,006,155
[45] Date of Patent: Dec. 21, 1999

[54] REAL-TIME MISFIRE DETECTION FOR AUTOMOBILE ENGINES WITH MEDIUM DATA RATE CRANKSHAFT SAMPLING

[75] Inventors: Zhijian James Wu, Rochester Hills; Anson Lee, St. Clair, both of Mich.

[73] Assignee: Chrysler Corporation, Auburn Hills, Mich.

[21] Appl. No.: 09/132,872

[22] Filed: Aug. 12, 1998

Related U.S. Application Data

[63] Continuation-in-part of application No. 08/835,393, Apr. 7, 1997, Pat. No. 5,862,507.

[51] Int. Cl.$^6$ ....................................................... F02D 41/00
[52] U.S. Cl. ............... 701/111; 123/406.24; 123/406.64; 73/117.3
[58] Field of Search ....................... 701/111; 123/406.24, 123/406.33, 406.6, 406.65, 406.64; 73/116, 117.3

[56] References Cited

U.S. PATENT DOCUMENTS

| | | | |
|---|---|---|---|
| 3,908,366 | 9/1975 | Masaki | 60/277 |
| 4,179,922 | 12/1979 | Bouverie et al. | 73/116 |
| 4,186,701 | 2/1980 | Suzuki et al. | 123/435 |
| 4,271,811 | 6/1981 | Suzuki et al. | 123/698 |
| 4,308,519 | 12/1981 | Garcea et al. | 340/439 |
| 4,461,257 | 7/1984 | Hosaka et al. | 123/406.24 |
| 4,488,528 | 12/1984 | Morikawa | 123/406.26 |
| 4,491,110 | 1/1985 | Bone et al. | 123/594 |
| 4,532,592 | 7/1985 | Citron et al. | 701/105 |
| 4,562,818 | 1/1986 | Kohama et al. | 123/478 |
| 4,606,224 | 8/1986 | Tedeschi et al. | 73/117.3 |
| 4,716,874 | 1/1988 | Hilliard et al. | 123/406.14 |
| 4,782,692 | 11/1988 | Peden et al. | 73/117.3 |
| 4,846,129 | 7/1989 | Noble | 123/406.14 |
| 4,862,093 | 8/1989 | Jiewertz | 324/464 |

(List continued on next page.)

OTHER PUBLICATIONS

FIR Windowed Filter Design Program—Window, L. R. Rabiner and C. A. McGonegal (pp. 5.2–1 through 5.2–19).

Estimate of IC Engine Torque from Meausrement of Crankshaft Angular Position, Girogio Rizzoni and Francis T. Connolly, Ohio State University (SAE Paper No. 932410).

An On–Line Engine Roughness Meausrement Technique, William P. Mihelc and Stephen J. Citron, School of Mechanical Engineering, Purdue University (SAE Paper No. 840136).

Cylinder by Cylinder Engine Pressure and Pressure Torque Waveform Determination Utilizing Speed Fluctuations, Stephen J. Citron, John E. O'Higgins, and Lillian Y. Chen, Engine Controls Lab, School of Mechanical Engineering, Purdue University, West Lafayette, Indiana (SAE Paper No. 890486).

(List continued on next page.)

*Primary Examiner*—Willis R. Wolfe
*Assistant Examiner*—Hieu T. Vo
*Attorney, Agent, or Firm*—Mark P. Calcaterra

[57] ABSTRACT

A method and system for detecting engine misfire in an internal combustion engine. A data signal containing a plurality of groups of data points generated from sampling crankshaft rotational displacement over three predetermined angular sampling windows; is generated. Each of the plurality of groups of sampled data points represents a cylinder firing event. The data signal is conditioned, and the plurality of groups of sampled data points are, mapped into single misfire data points. The mapped single misfire detection points are then compared to a misfire detection dynamic threshold, and a misfire detection signal is output if the misfire detection points fall outside the dynamic threshold. The misfire detection system achieves high degree of accuracy through a multi-stage signal conditioning, multi-rate signal processing and statistical decision technology and a mixed size of window sampling strategy, and is capable of being installed on a large scale in motor vehicles through use of existing on board automotive microcontroller technology.

11 Claims, 12 Drawing Sheets

U.S. PATENT DOCUMENTS

| | | | |
|---|---|---|---|
| 4,886,029 | 12/1989 | Lill et al. | 123/479 |
| 4,928,228 | 5/1990 | Fujimoto et al. | 701/112 |
| 4,930,479 | 6/1990 | Osawa et al. | 123/436 |
| 4,930,481 | 6/1990 | Fujimoto et al. | 123/481 |
| 4,932,379 | 6/1990 | Tang et al. | 123/436 |
| 4,936,277 | 6/1990 | Deutsch et al. | 123/436 |
| 4,941,445 | 7/1990 | Deutsch | 123/406.18 |
| 4,976,241 | 12/1990 | Ishida et al. | 123/406.37 |
| 4,987,711 | 1/1991 | Noji et al. | 52/167.2 |
| 4,987,771 | 1/1991 | Iwata | 73/117.3 |
| 5,021,960 | 6/1991 | Manaka et al. | 701/99 |
| 5,044,194 | 9/1991 | James et al. | 73/112 |
| 5,044,195 | 9/1991 | James et al. | 73/117.3 |
| 5,056,360 | 10/1991 | Dosdall et al. | 73/116 |
| 5,095,742 | 3/1992 | James et al. | 73/116 |
| 5,109,695 | 5/1992 | James et al. | 73/117.3 |
| 5,117,681 | 6/1992 | Dosdall et al. | 73/116 |
| 5,144,927 | 9/1992 | Denz | 73/116 |
| 5,200,899 | 4/1993 | Ribbens et al. | 701/111 |
| 5,231,869 | 8/1993 | Klenk et al. | 73/116 |
| 5,239,473 | 8/1993 | Ribbens et al. | 701/111 |
| 5,263,453 | 11/1993 | Wakahara et al. | 123/436 |
| 5,278,760 | 1/1994 | Ribbens et al. | 701/111 |
| 5,307,671 | 5/1994 | Akase | 73/117.3 |
| 5,313,407 | 5/1994 | Tiernan et al. | 700/280 |
| 5,357,790 | 10/1994 | Hosoya | 73/117.3 |
| 5,361,628 | 11/1994 | Marko et al. | 73/116 |
| 5,361,629 | 11/1994 | McCombie | 73/117.3 |
| 5,379,634 | 1/1995 | Kuroda et al. | 73/116 |
| 5,381,689 | 1/1995 | Ishida | 73/116 |
| 5,387,253 | 2/1995 | Remboski, Jr. et al. | 73/117.3 |
| 5,392,641 | 2/1995 | McCombie | 73/117.3 |
| 5,508,927 | 4/1996 | Remboski, Jr. et al. | 701/111 |
| 5,515,720 | 5/1996 | Remboski, Jr. et al. | 73/116 |
| 5,544,521 | 8/1996 | McCombie | 73/117.3 |
| 5,561,600 | 10/1996 | McCombie | 701/111 |
| 5,574,217 | 11/1996 | McCombie | 73/116 |
| 5,574,646 | 11/1996 | Kawasaki et al. | 384/431.08 |
| 5,576,983 | 11/1996 | Ribbens et al. | 384/431.08 |
| 5,602,331 | 2/1997 | Prevost | 73/116 |
| 5,668,725 | 9/1997 | Naik | 701/111 |
| 5,687,082 | 11/1997 | Rizzoni | 701/111 |
| 5,699,252 | 12/1997 | Citron et al. | 364/431.08 |
| 5,699,253 | 12/1997 | Puskorius et al. | 701/111 |
| 5,862,507 | 1/1999 | Wu et al. | 701/111 |

OTHER PUBLICATIONS

Advanced Signal Processing for Misfire Detection In Automotive Engines, William B. Ribbens and Steven Bieser, © 1995 IEEE.

Analysis and Processing of Shaft Angular Velocity Signals in Rotating Machinery for Diagnostic Applications, Yong W. Kim, Giorgio Rizzoni, Bahman Samimy, Yue Y. Wang, © 1995 IEEE.

Detection of Partial Misfire In IC Engines Using a Measurement of Crankshaft Angular Velocity, Donghyeon Lee (Hyundai Motor Co.) and Giorgio Rizzoni (The Ohio State Univ.) (SAE Paper No. 951070).

Road Test Results of an I–C Engine Misfire Detection System, W.B. Ribbens and J. Park, University of Michigan (SAE Paper No. 930398).

Methods of On–Board Misfire Detection, Günther Plapp, Martin Klenk and Winfried Moser, Robert Bosch GmbH (SAE Paper No. 900232).

Misfire Detection by Evaluating Crankshaft Speed—A Means to Comply with OBDII, Martin Klenk and Winfried Moser (Robert Bosch GmbH) and Werner Mueller and Wolfgang Wimmer (Audi AG) (SAE Paper No. 930399).

Diagnosis of Individual Cylinder Misfires by Signature Analysis of Crankshaft Speed Fluctuations, G. Rizzoni, University of Michigan, ©1989 (SAE Paper No. 890884).

Measurement of Engine Misfire in the Lamborghini 533 V–12 Engine Using Crankshaft Speed Fluctuations, P. Azzoni and G. Cantoni (ENEA), G. Minelli and D. Moro (Universitá di Bologna), Giorgio Rizzoni (The Ohio State Univ.), M. Ceccarani and S. Mazzettl (Lamborghini Automobili) (SAE Paper No. 950837).

The Effect of Engine Misfire on Exhaust Emission Levels in Spark Ignition Engines, Ahmed Soliman, Giorgio Rizzoni, and Vasanth Krishnaswami, Ohio State University (SAE Paper No. 950480).

Road Tests of a Misfire Detection System, William B. Ribbens and Jaehong Park, University of Michigan (SAE Paper No. 940975).

A New Metric for Torque Nonuniformity, William B. Ribbens (SAE Paper No. 830425).

Applications of Precise Crankshaft Position Measurements for Engine Testing, Control and Diagnosis, W.B. Ribbens and G. Rizzoni (SAE Paper No. 890885).

A Mathematical Model Based Method for Diagnosing Failures in Automotive Electronic Systems, W.B. Ribbens (SAE Paper No. 910069).

Onboard Diagnosis of Engine Misfires, William B. Ribbens and Giorgio Rizzoni (SAE Paper No. 901768.

Estimate of Indicated Torque from Crankshaft Speed Fluctuations: A Model for the Dynamics of the IC Engine, Giorgio Rizzoni, IEEE Transactions on Vehicular Technology, vol. 38, No. 3, Aug. 1989 (© 1990 IEEE).

Crankshaft Position Measurement with Applications to Ignition Timing, Diagnostics and Performance Measurement, Yibing Dong, Giorgio Rizzoni and William B. Ribbens— ©1987 (SAE Paper No. 871914).

Fast Transforms for Rapid Isolation of Misfiring Cylinders, Giorgio Rizzoni ©1987 (SAE Paper No. 871915).

Applications of Precise Crankshaft Position Measurements for Engine Testing, Control and Diagnostics, W.B. Ribbens and G. Rizzoni (SAE Paper No. 890885).

Torque Nonuniformlty Measurements In Gasoline Fueled Passenger Cars Equipped with Automatic Transmission— Theory and Experimental Results, W.B. Ribbens and D. Gross (SAE Paper No. 860414).

A Non–Contacting Torque Sensor for the Internal Combustion Engine, W.B. Ribbens (SAE Paper No. 810155).

Experimental Road Test of a Noncontacting Method of Measuring I–C Engine Torque Nonuniformity, William B. Ribbens, ©1985 (SAE Paper No. 850454).

On–Line Estimation of Indicated Torque in IC Engines Using Nonlinear Observers, Sergey Drankunov, Giorgio Rizzoni and Yue–Yun Wang, The Ohio State University (SAE Paper No. 950840).

REAL-TIME MISFIRE DETECTION FOR AUTOMOBILE ENGINES WITH MEDIUM DATA RATE CRANKSHAFT SAMPLING

CROSS-REFERENCE TO RELATED APPLICATIONS

The present application is a Continuation-In-Part of U.S. application Ser. No. 08/835,393, filed Apr. 7, 1997, entitled "Real Time Misfire Detection for Automobile Engines With Medium Data Rate Crankshaft Sampling" to Wu, et al. which is now U.S. Pat. No. 5,862,507 issued Jan. 19, 1999.

BACKGROUND OF THE INVENTION

1. Technical Field

The present invention relates generally to internal combustion engines and, more particularly, to an automobile engine misfire detection system based on digitally filtered medium data rate crankshaft rpm sampling that exhibits misfire detection accuracy similar to systems having high data crankshaft rpm sampling, but with less associated computational complexity.

2. Discussion

Government regulations require automobile manufacturers to control the exhaust of engine combustion byproducts such as hydrocarbons, carbon monoxide, and nitrous oxide. Emission of such byproducts is typically controlled via a catalytic converter which operates at a high temperature and, through the use of a catalyst, burns the aforementioned unwanted exhaust byproducts to reduce automobile emissions. These catalytic converters, enable automobile manufacturers to comply with government regulations in a cost-effective manner.

However, if an automobile engine misfires, an increased amount of unburned combustion byproducts is passed through the catalytic converter. Engine misfire occurs as a result of the absence of spark in a cylinder, poor fuel metering, poor compression, or other similar conditions. Over time, regular engine misfire can lead to damage of the catalytic converter and, consequently, increased amounts of unburned byproducts being admitted into the atmosphere.

As a result, regulatory agencies such as the California Air Resources Board (CARB) require that many motor vehicles with feedback fuel control systems be equipped with an emission malfunction indicator that identifies a misfiring engine and the particular malfunctioning component or components. Thus, upon the malfunction indicator being activated, the vehicle operator could proceed to a qualified vehicle repair center to have the malfunctioning component repaired or replaced before an excessive amount of exhaust byproducts is emitted into the air by the vehicle.

Typically, these malfunction indicators generate data allowing identification of specific misfiring engine cylinders. In particular, the CARB rules, known as On-Board Diagnostics II guidelines, mandate that the automobile manufacturer specify a percentage of misfires out of the total number of firing events necessary for determining malfunction for: (1) the percent misfire evaluated in a fixed number of revolution increments for each engine speed and load condition which would result in catalyst damage; (2) the percent misfire evaluated in a certain number of revolution increments which would cause a motor vehicle to fail a federal test procedure by more than 1.5 times the CARB standard if the degree of misfire were present from the beginning of the test; and (3) the degree of misfire evaluated in a certain number of revolution increments which would cause a motor vehicle to fail inspection and a maintenance program tailpipe exhaust emission test. It is contemplated that similar rules are or may be enacted by other states as by the federal government in the foreseeable future.

Government regulations such as those mandated by CARB also require that automobile manufacturers be able to provide information identifying misfiring engine cylinders. This misfire information is typically collected and stored in a computer memory associated with the automobile engine and later downloaded at a service center and is used in diagnostic testing of the vehicle. One misfire detection and identification approach is disclosed in U.S. Pat. No. 5,361,629, issued Nov. 8, 1994 entitled "Single Sensor Misfire Detection Apparatus and Method for an Internal Combustion Engine". The misfire detection approach disclosed in the aforementioned patent senses crankshaft rotation and calculates a crankshaft velocity based on the sensed rotation of a sensor wheel associated with the crankshaft. The calculated crankshaft velocity changes or a compensated velocity change is compared to a predetermined stored crankshaft velocity range to determine engine misfire.

Additional engine misfire detection approaches are disclosed in U.S. Pat. No. 5,574,217 issued Nov. 12, 1996 for "Engine Misfire Detection with Compensation for Normal Acceleration of Crankshaft"; U.S. Pat. No. 5,544,521 issued Aug. 13, 1996 for "Engine Misfire Detection with Rough Road Inhibit"; and U.S. Pat. No. 5,602,331 issued Feb. 11, 1997 for "Engine Misfire Detection with Cascade Filter Configuration". The approaches disclosed in the above mentioned patents and patent applications relate to engine misfire detection including sorting of a plurality of changes in crankshaft angular velocity, as measured by sensing rotation of a sensor wheel associated with the crankshaft, over a predetermined series of cylinder firings in averaging the two middle most angular velocity changes to provide an average change in velocity value. The deviation is determined between the change in angular velocity for a selected cylinder and the average change in velocity value. Misfires are detected as a function of a comparison of the deviation with a predetermined threshold velocity valve stored in a system controller.

Generally, a number of conventional misfire detection approaches work well at engine speeds below 4000 rpm. At these lower engine speeds, with cylinder identification engine misfire detection can be realized through monitoring of engine rpm alone. Even at low engine speeds, however, transient signals caused by conditions such as powertrain bobble, engine noise, changing of gears, or engine acceleration and deceleration may cause false engine misfire detection. Additionally, at higher engine speeds of typically greater than 4,000 rpm, engine induced crankshaft flex, or torsional vibration, can cause false engine misfire detection.

To reduce the number of false engine misfire detections, the approach disclosed in pending U.S. application Ser. No. 08/511,125 filed Aug. 4, 1995 for "Engine Misfire Detection with Digital Filtering" was developed to filter out noise related signals at both low and high engine frequencies to achieve an enhanced signal to noise ratio for detecting engine cylinder misfires. A crankshaft velocity signal is generated by measuring the amount of time expired over a 40° crankshaft angular displacement interval for a cylinder expansion stroke. A digital high pass finite impulse response (FIR) filter operates at low engine speeds to filter out low frequency engine noise. At high engine speeds, a low pass FIR filter operates to filter out high frequency engine noise from the crankshaft rotation signal.

In addition, many conventional misfire detection approaches analyze engine firing frequency through a fast fourier transform (FFT) or other similar frequency domain-based analysis to determine whether an engine misfire has occurred for a particular cylinder firing event. However, the aforementioned approaches are typically complex and do not take into account manifold absolute pressure (MAP) in setting a particular threshold value, for engine misfire detection.

Further, many conventional misfire detection methods utilize low data rate sampling of engine crankshaft velocity or acceleration where crankshaft angular velocity is sampled only once per cylinder firing event. With low data rate sampling, higher order harmonic components of the engine firing frequency, which often contain valuable misfire information for higher engine speeds, frequently are folded back, or aliased, into lower noise-related engine frequencies. These aliased signals may cause misinterpretation of cylinder firing event data.

Further, pending U.S. patent application Ser. No. 08/691,100 filed Aug. 1, 1996 for "Real Time Misfire Detection for Automobile Engines" and pending U.S. patent application Ser. No. 08/695,766 filed Aug. 1, 1996 for "Spatial Frequency Implemented Digital Filters for Engine Misfire Detection" relate to a misfire detection technique that can identify multiple engine misfires through evaluation of engine speed and average MAP data alone, without the need for complex frequency-based methods of analysis, such as Fast Fourier transform-based methods, or the need for additional engine system data such as engine temperature or throttle feedback data. Also, the above pending applications relate to an engine misfire detection method in which one of a multiple of FIR filter banks is operative over a predetermined range of engine speeds to provide effective removal of noise related signals from the signal representing crankshaft angular velocity that samples crankshaft angular velocity at a high data rate of 18 samples per cylinder firing event so that change in crankshaft angular velocity over a given band of engine frequencies around the engine firing frequency may be determined to produce more accurate engine misfire calculations and that utilizes MAP data to set a particular signal threshold for a given set sampled crankshaft angular velocities.

Also, U.S. Pat. No. 5,744,722 for "Deconvolution Method of Resonance Detection and Removal from Crankshaft Speed Measurements" and U.S. Pat. No. 5,717,133 for "Mixed Sampling Rate Processing for Misfire Detection" disclose systems and techniques for improving misfire detection accuracy.

While the above described misfire detection approaches are effective in detecting engine misfire, there is still room for improvement in the art. In particular, there is a need for a misfire detection system that utilizes medium data rate crankshaft rpm data sampling through measurement of the angular velocity of a crankshaft sensor wheel at a medium data rate at or near the Nyquist rate to achieve misfire detection with an accuracy typically associated with systems utilizing high data rate crankshaft sampling, and with less computational complexity. There is also a need for a misfire detection technique that utilizes signal processing and statistical derision techniques in addition to medium data rate sampling, to further enhance system accuracy.

SUMMARY OF THE INVENTION

The present invention provides a method and system for detecting engine misfire in an internal combustion engine. The present invention utilizes medium data rate crankshaft sampling in determining whether engine misfire has occurred by measuring angular velocity of a crankshaft through sampling of angular velocity of a crankshaft sensor wheel over 3 predetermined angular sampling windows for a particular cylinder firing event. Through use of medium data rate crankshaft sampling, together with a multi-stage signal conditioning, multi-rate signal processing and statistical decision techniques, the overall system computational complexity, and thus the cost of realizing the system, is minimized.

More particularly, the present invention provides a method of detecting engine misfire in an internal combustion engine in which the data signal containing a plurality of groups of sample data points is generated. Each of the groups of sample data points represents a cylinder firing event. The data signal is then conditioned for misfire detection processing. Each group of sample data points is then mapped into a single mapped data point. The mapped data points are then compared to a misfire detection dynamic threshold. A misfire detection signal is then output if any of the mapped data points fall outside the dynamic threshold.

According to another embodiment of the present invention, a motor vehicle internal combustion engine misfire detection system is provided. The system includes a crankshaft velocity sensor that senses the velocity of a vehicle crankshaft based on medium data rate crankshaft sampling and that generates a corresponding engine speed signal. The system also provides a manifold sensor that senses manifold absolute pressure (MAP) and generates a corresponding manifold absolute pressure signal. A signal preprocessing sub-system is also provided that extracts average and fluctuation signal components from the engine speed and MAP signals for detecting both engine normal fire and misfire cylinder firing events. The system also provides a decimator that maps every M points into one mapped data point for misfire detection processing, for a medium data sampling rate with M points sampled per cylinder firing event, where M is a positive integer greater than one. A dynamic decision sub-system is also provided that determines from the mapped points if the signal represents an engine misfire event or an engine normal firing event and that generates an output signal indicative thereof.

DETAILED DESCRIPTION OF THE DRAWINGS

DETAILED DESCRIPTION OF THE PREFERRED EMBODIMENT

Figure 1:
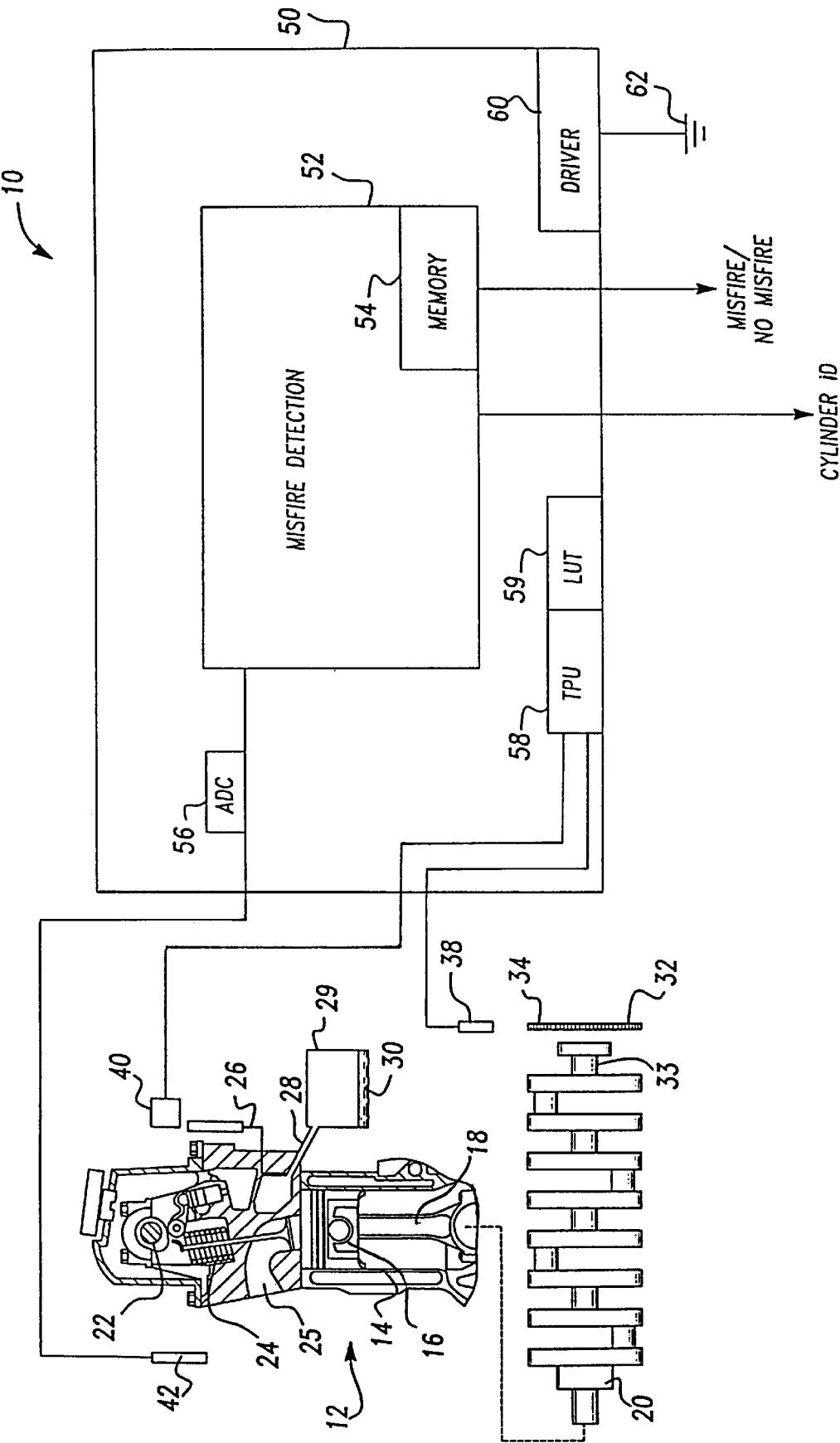
FIG. 1 illustrates a side elevational view of a spark-ignited internal combustion motor vehicle engine in cross-section, a crankshaft associated with the engine, and a block diagram of a motor vehicle electronic control unit in which the misfire detection system of the present invention is implemented.

Referring now to the drawing figures, a block diagram of the engine system, in which the misfire detection system of the present invention is implemented, is shown generally at 10. The system 10 includes an internal combustion spark ignited engine 12, shown in partial cross-section, which is of the type implemented in a conventional motor vehicle (not shown). The engine contains a plurality of cylinders, represented by the cylinder 14, with each of the cylinders having a piston, represented by the piston 16, operatively disposed therein. Each of the pistons is connected by a connecting rod 18 to a crankshaft 20. A conventional engine cam shaft 22 is also operatively located within the engine for opening and closing intake and exhaust valves, such as the intake valve 24, associated with the cylinder 14 for supplying a fuel/air mixture to the cylinders in a manner well known in the art during the piston intake. A manifold 25 is also operatively associated with the intake valve 24 for supplying air from outside of the engine into the cylinder 14 to provide air for the valve fuel/air mixture supplied to the cylinder.

The engine 12, for example, is a conventional four-cylinder, four-stroke engine having an intake stroke in which fuel and air mixture is input into the cylinder 14 through the intake valve 24, a compression stroke in which the fuel/air mixture is compressed by the piston 16, an expansion stroke in which a spark supplied by a spark plug 26 ignites the fuel/air mixture, and an exhaust stroke during which gases from the burned fuel are exhausted from the cylinder through an exhaust system 28, which includes a catalytic converter 29 having an associated catalyst 30. Although the preferred embodiment of the present invention is implemented in a four cylinder, four-stroke engine such as that shown at 12, it should be appreciated that the present invention may be implemented in any conventional engine system, including a two-stroke engine system, or any spark ignited or diesel engine system.

Figure 2:
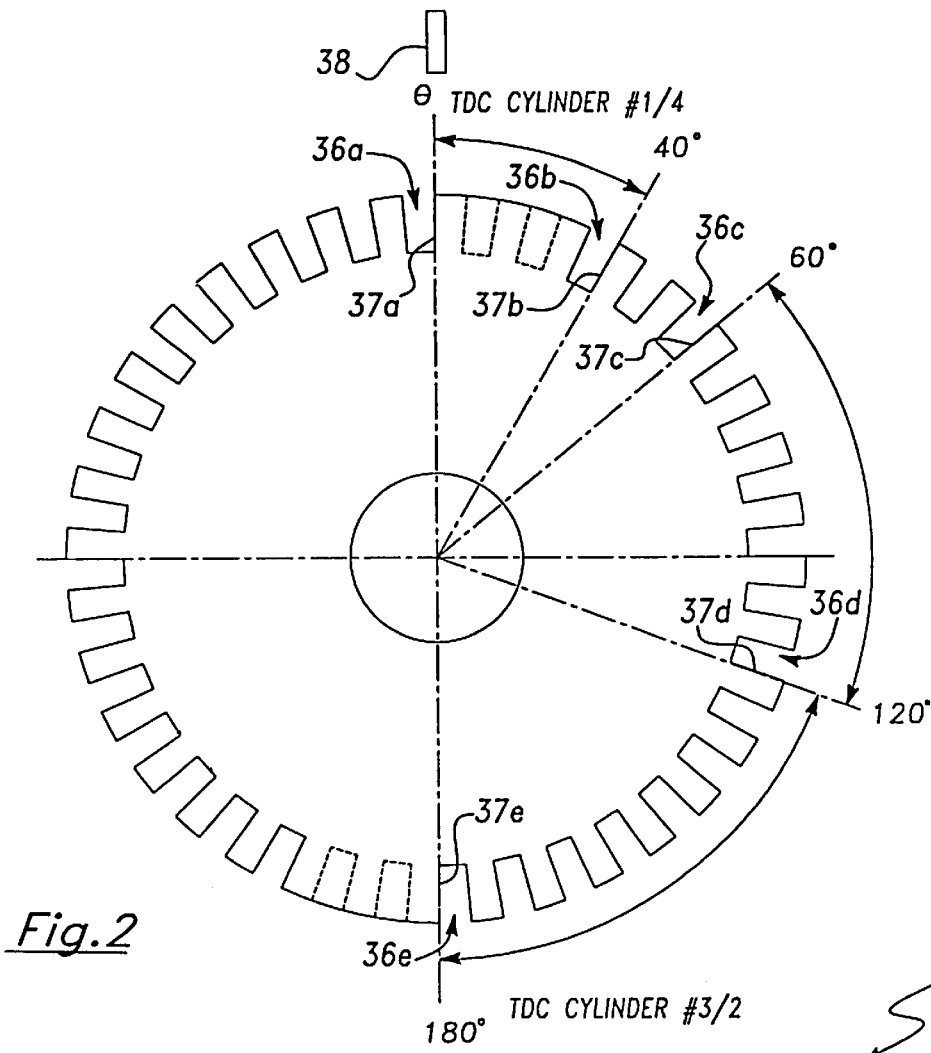
FIG. 2 is an enlarged front view of the crankshaft sensor wheel and crankshaft sensor shown in FIG. 1.

Still referring to FIG. 1, a crankshaft sensor wheel 32 is operatively fastened to a sensor wheel mount nose 33 by screws or other similar fastening devices. The sensor wheel mount nose is in turn spot welded or otherwise operatively connected to the crankshaft. Referring to FIG. 2, the crankshaft sensor wheel 32 includes a plurality of teeth 34 defining slots 36 therebetween. The slots 36 operate as crankshaft angular velocity sensing points for measuring the angular velocity of the crankshaft, and thus the engine speed. It should be understood that the terms engine speed and crankshaft angular velocity are directly proportional to one another and may be used interchangeably throughout the specification.

Referring again to FIG. 2, a slot 36a is formed in the crankshaft wheel 32 at a position corresponding preferably to a piston position of about 0° top dead center (TDC) at the end of the piston compression stroke. At least one slot 36b is formed in the wheel 32 adjacent the slot 36a and preferably at a position corresponding to a piston location at 40° after TDC. However, it should be appreciated that other slots may be formed in the crankshaft sensor between the slots 36a, 36b to initiate ignition timing control or for other timing purposes. First and second edges 37a, 37b are associated with the first and second slots 36a, 36b. The first edge corresponds to the initiation of crankshaft angular velocity measurements for cylinder numbers 1 and 4 in the four cylinder engine arrangement, while the second edge corresponds to the termination of these measurements. Also, two slots 36c, 36d are formed in the crankshaft sensor wheel 32 to form third and fourth edges 37c, 37d, with the third edge being oriented 20° apart from the second edge 37b on the crankshaft sensor wheel, and with the third and fourth edges being spaced about 60° apart from one another. In addition, a slot 36e is formed in the crankshaft sensor wheel 32 to form a fifth edge 37e with the fourth and fifth edges being spaced about 60° apart from one another.

It should be appreciated that the engine cylinders 1 to 4 are oriented in a conventional straight-line configuration. As a result, each cylinder has a 180° expansion stroke with a cylinder firing order of 1-3-4-2. Angular velocity measurements for the crankshaft 20 are measured by determining the time period for crankshaft angular displacement $\Theta$ as follows the initial velocity measurement is taken for a 40° interval for each of the four cylinders after the piston reaches top dead center (TDC) at the end of the compression stroke. This 40° interval preferably begins at the end of the piston compression stroke. Subsequently, a second angular velocity measurement is taken for a 60° expansion stroke interval for each of the four cylinders after an approximately 20° angular displacement from the end of the initial 40° interval. A third angular velocity measurement is taken for a 60° expansion stroke interval for each of the four cylinders immediately following the second measurement. By measuring the time period for each of the above three unequal angular displacement intervals, a medium data rate (MDR) sampling of the crankshaft is achieved.

It should be appreciated that the misfire detection system of the present invention is realized through medium data rate crankshaft sampling wherein three intervals of crankshaft sensor wheel rotations are measured per cylinder firing event. However, the data sampling rate may alternatively encompass any number of sampling intervals between, for example, 2 and 18 sampling intervals, limited by the capability of data acquisition and processing, per cylinder firing event. The crankshaft sensor wheel angular displacement associated with each sampling interval may also vary according to specific system implementation.

Referring again to FIG. 1, the system 10 also includes a crankshaft sensor 38 in communication with the sensor wheel 32, and a cam position sensor 40 in communication with the cam shaft 22. Both the crankshaft sensor 38 and the cam shaft sensor 40 generate signals used by the misfire detection system of the present invention in a manner discussed in detail below. The crankshaft sensor 38 measures time elapsed between rotation of slot edges 37a, 37b, and subsequently edges 37c, 37d, and 37d, 37e, past the crankshaft sensor 38. The crankshaft sensor subsequently generates an analog signal corresponding to this rotation time period that is utilized in determining crankshaft angular velocity, and thus engine speed, as will be described in detail below.

The cam shaft sensor 40 is utilized for identification of specific cylinder firing events and is implemented based on the fact that the cam shaft 22 rotates 360° for every 720° of rotation of the crankshaft 20. Cylinder firing event identification enables the misfire detection system of the present invention to indicate which cylinder or cylinders are misfiring. The engine system 10 preferably uses a stock cam sensor and associated cylinder identification technique to determine the TDC of the number 1 cylinder. However, other cylinder identification techniques may be used according to the specific engine system.

The system 10 additionally includes a manifold absolute pressure (MAP) sensor 42 for measuring fluctuations in the air pressure in the manifold 25. Additional engine system components and sensors are not shown, as such components and sensors are conventional and are well known to those skilled in the art. It should be appreciated at this point that the crankshaft sensor 38 and the cam shaft sensor 40 may be Hall effect sensors, optical sensors, variable reluctance sensors, or any other type of position sensors well known in the art. The MAP sensor 42 is a typical piezoelectrical pressure sensor well known in the art. Each of the sensors 38, 40 and 42 generates an electrical signal representative of the sensed condition and sends this signal to an electronic control unit (ECU) 50 associated with additional control circuitry (not shown) within the motor vehicle.

The ECU 50 includes a micro-controller 52 having an associated memory 54 and analog to digital converters 56 for converting analog signals from the sensor 42 to digital signals. The memory 54 is a memory of the type well known in the art and includes a random access memory (RAM), a read-only memory (ROM), and/or any other similar type of conventional computer memory. A time processor unit (TPU) 58, also implemented at the ECU 50, processes outputs from the sensors 38 and 40, for use in the misfire detection system of the present invention, and provides timing signals and other data processing. The ECU 50 also includes a lamp driver 60 which, upon the appropriate output signal being generated by the micro-controller 52, drives an output display such as a driver warning light 62. The electronic control unit further includes additional timers, counters and like components of the type typically associated with a conventional micro-controller.

Figure 3:
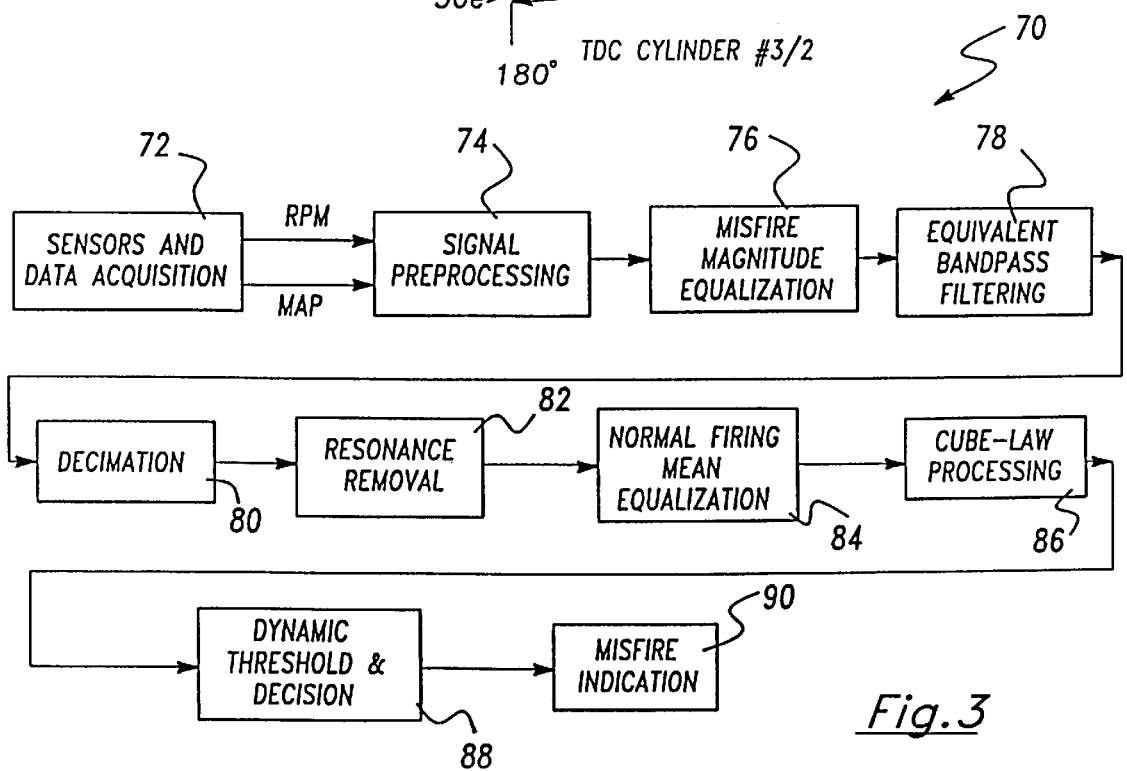
FIG. 3 is a block diagram of the methodology utilized in the misfire detection system according to a preferred embodiment of the present invention.

Referring to FIG. 3, a block diagram of the medium data rate misfire detection system is shown at 70. The MDR misfire detection system of the present invention is preferably realized through conventional controllers such as the commercially available Chrysler SBEC III controller having an HC16 conventional microcontroller. The system of the present invention can be realized in such a conventional controller because of its low computational requirement. With the particular selection of the sampling window sizes, the MDR system of the present invention, which utilizes three data points per firing for misfire detection, exhibits a high degree of accuracy close to that of utilization of high data rate (18 sensor wheel data points per cylinder firing event) but needs only approximately twenty (20%) percent of the computational requirements for the high data rate systems. This low computational requirement is even lower than that of many current low data rate (1 data point measured per cylinder firing event) systems, such as the low data rate system currently realized in the SBEC III controller.

The MDR misfire detection system achieves this high degree of accuracy through a multi-stage signal conditioning and multi-rate signal processing technique realized via the processing blocks shown in the system 70. The processing blocks are implemented at the controller through conventional software programming techniques, such as assembly languages of Motorola HC 16 microcontroller or DSP processors. Alternatively, the processing blocks may be realized via hardware implementation, such as programmable logic devices. In particular, the system includes a sensor and data acquisition block 72 which feeds data into a signal preprocessing block 74. Upon performing its function, the signal preprocessing block 74 inputs the pre-processed crankshaft speed and manifold pressure data into a misfire magnitude equalization block 76. The equivalent band pass filtering block 78 subsequently filters the data signal input from the misfire magnitude equalization block 76 before passing the signal to a decimation block 80. The decimation block 80 downsamples data points within the signal and inputs the decimated signal into a resonance removal block 82 that removes resonance noise, such as that caused by powertrain dynamics, from the input signal. The resonance removal block subsequently inputs the signal into a normal firing mean equalization block 84, which further conditions the signal before inputting the signal into a cube-law processing block 86, which enhances separation between signatures of misfire and normal fire signals. After being processed in the cube-law processing block, the signal is fed into a dynamic threshold and decision block 88 which determines from the processed signal whether an engine misfire has occurred for a particular cylinder firing event. The dynamic threshold and decision block 88 subsequently outputs a signal indicating whether an engine misfire or a normal engine fire has occurred for the particular firing event at the misfire indication block 90. In order to provide a more comprehensive understanding of the structure and function of the present invention, each of the above identified processing blocks will be discussed in more detail as follows.

Still referring to FIG. 3, the sensor and data acquisition block 72 is associated with the crankshaft sensor wheel 32 and crankshaft sensor 38 which, as described above, generate and transmit data relating to the crankshaft angular velocity. In addition, the block 72 is associated with the cam position sensor 40 and the map sensor 42. The sensors and data acquisition block 72 may also be associated with any other data generating devices included in the motor vehicle powertrain for use in generating data related to the present invention.

The signals utilized by the detection method and system of the present invention include engine speed rpm, as measured by the sensor wheel 32, and the manifold absolute pressure (MAP) as measured by the MAP sensor 42. In addition, the cam signal, as measured by the cam position sensor 40, is used for system synchronization and engine cylinder identification as described above. As the sensor wheel rotates with the crankshaft, the tooth edges identified above are sensed and converted to an electrical signal by the crankshaft sensor 38. The timing between the edges of the electrical signal is measured by the controller, and the engine rpm is then calculated via this measured data.

In the present invention, rpm sampling rate is the most critical data signal. The map signal sampling rate is reduced to a rate lower than that of the rpm sampling rate to reduce the system computational requirements. For example, the map signal can be sampled at the rate of one data point between individual cylinder firing events, rather than the three data points per firing event described above.

The signal preprocessing block 74 is utilized to extract the desired signal components from the input sensed crankshaft and MAP signals. In particular, the average and fluctuation signal components are extracted from the engine rpm signal $N(k)$ and the average signal components from the manifold absolute pressure signal $P(k)$, respectively, using the digital filters described above and other frequency filtering techniques, such as mean filters, exponential filters and FIR filters. The block may also extract other information, such as cylinder identifications information.

The most important signal components for the misfire detection system of the present invention are the fluctuation components of the rpm signals denoted by $\tilde{N}(k)$, as the fluctuation component inherently contains the engine misfire signature. The rpm and map average components denoted by $\overline{N}(k)$ and $P(k)$, respectively enable the system to compensate for various engine operating conditions. The signal preprocessing block scales all of the above signals to enable the controller to process the signals in the digital domain.

Figure 4:
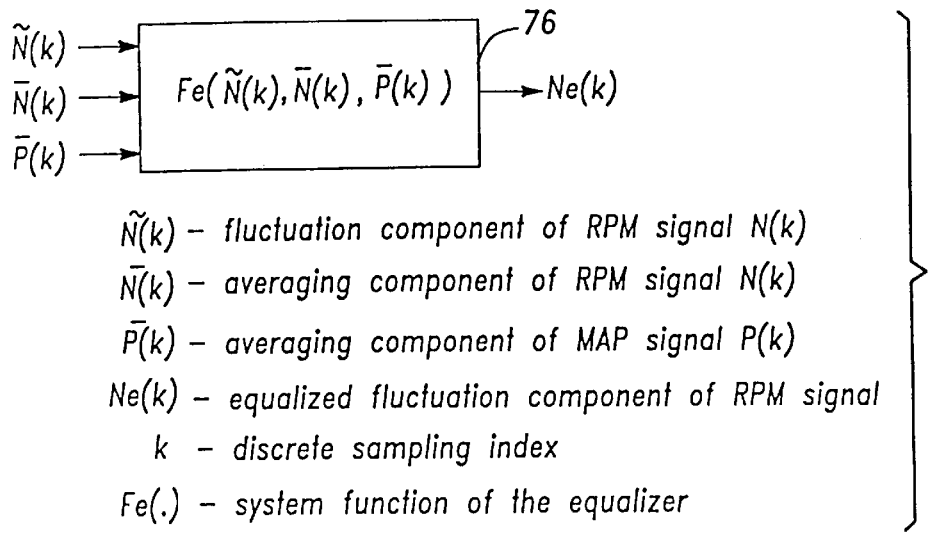
FIG. 4 is a block diagram showing the misfire magnitude equalization block of FIG. 3 in more detail.

The misfire magnitude equalization block 76 compensates for large variations in misfire signature magnitude due to engine operating conditions. Referring to FIG. 4, the block 76 is shown in more detail. The inputs to the equalization block include the engine speed fluctuation signal $\tilde{N}(k)$, the average engine speed component $\overline{N}(k)$, and the averaged manifold absolute pressure component $\overline{P}(k)$, with (k) being the discrete time index. The block 76 thus processes the signal through the system function $Fe(\tilde{N}(k)N(k),\overline{P}(k))$ of the equalizer, based on the magnitudes on the misfire signature from different engine operating conditions. The output signal from the misfire magnitude equalization block 76, Ne(k) is input into the equivalent band pass filtering block 78.

Referring again to FIG. 3, the equivalent band pass filtering block 78 subsequently filters the equalized signal Ne(k). Because all the dominant "frequency" components of the misfire signal fall below the engine firing "frequency" for data collected in crankshaft angular domain, the firing frequency and its higher order harmonic components are thus filtered out by the filtering block 78. This block plays an important role in filtering out undesired noise having a frequency beyond the interested misfire signature frequency band to further improve the signal to noise ratio. Preferably, a combination of filters such as FIR filters, mean filters and comb filters is used to effectively remove the undesired noise and efficiently realizes the equivalent band pass firing processing. With this technique, a low order, such as eighth order, FIR filter is utilized and is less expensive to implement.

The decimation block 80 is utilized to downsample the data points collected between two firing events. As more than one data point is generated between engine firing, events, the decision on whether an engine misfire has occurred will be based on more than one data point. For a data sampling rate with M>1 points per firing, the decimation block maps every M points into one data point to simplify additional misfire detection system processing. Preferably, the decimation block extracts one of the M points between two cylinder firing events based upon criteria, such as the separation performance of normal firing and misfire signatures. Typically, the middle data point of the M points is extracted and further processed. The decimation block 80 is realized between the equivalent band pass filtering block 78 and the resonance removal block 82 to reduce further computational requirements of subsequent processing blocks. However, the decimation block could also be realized just before the dynamic threshold and decision block 88.

The resonance removal block 82 detects and removes resonance noise caused by a vehicle powertrain system when an impulse type noise or signal excites the dynamic system, such as induced oscillation after misfire events and torsional vibration. For instance, a large drop in engine speed caused by misfire excites the powertrain and generates damped speed oscillation. The resonance removal block 82 therefore reduces false detection of engine misfire, especially when transmission is in high gear and engine speed is low. The resonance removal block 82 is implemented using a deconvolution method.

Figure 5:
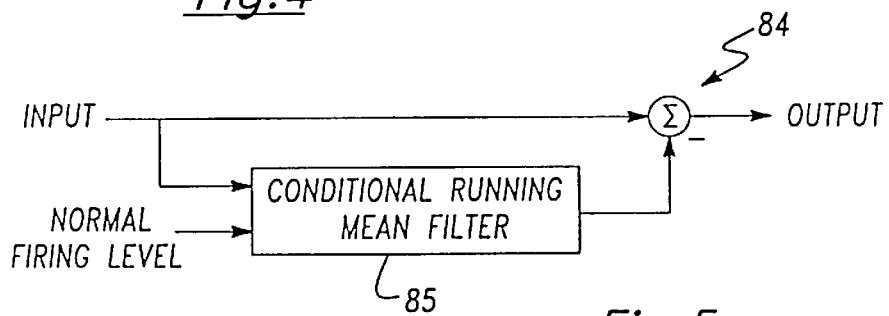
FIG. 5 is a detailed block diagram of the normal firing mean equalization block shown in FIG. 3.

The normal firing mean equalization block 84 compensates for variation in the mean of normal firing sample data points. As shown in more detail in FIG. 5, the block adjusts the signal input from the resonance removal block 82 based on a running mean calculated at a conditional running mean filter 85 from previous normal firing samples. As a result, the signal processed through the normal firing mean equalization block 84 has a zero mean characteristic for normal firing data point samples. In general, the data points representative of normal engine firings may not have values close to their mean level when misfire occurs in some kinds of misfire pattern.

Figure 6:
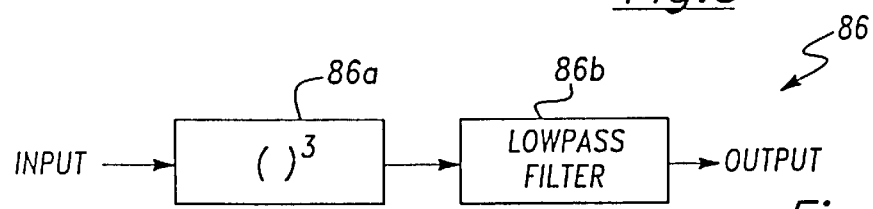
FIG. 6 is a detailed block diagram of the cube law processing block shown in FIG. 3.

After the signal is equalized through the block 84, it is input into the cube law processing block 86. As shown in more detail in FIG. 6, the cube law processing block cubes the input signal through cubing block 86a and then filters the signal through a low pass filter 86b before outputting to the dynamic threshold and decision block 88. The block 86 increases separation between signatures of misfire data points and normal fire data points in the crankshaft velocity signal, and is effective when the signal input into the block has relatively high signal to noise ratio. The low pass filter in the block is preferably realized through programming of the controller, and although it may not be necessary for certain signal processing, it is preferably used to filter high order harmonics generated by the cube operation of the system, along with undesired noise.

Figure 7:
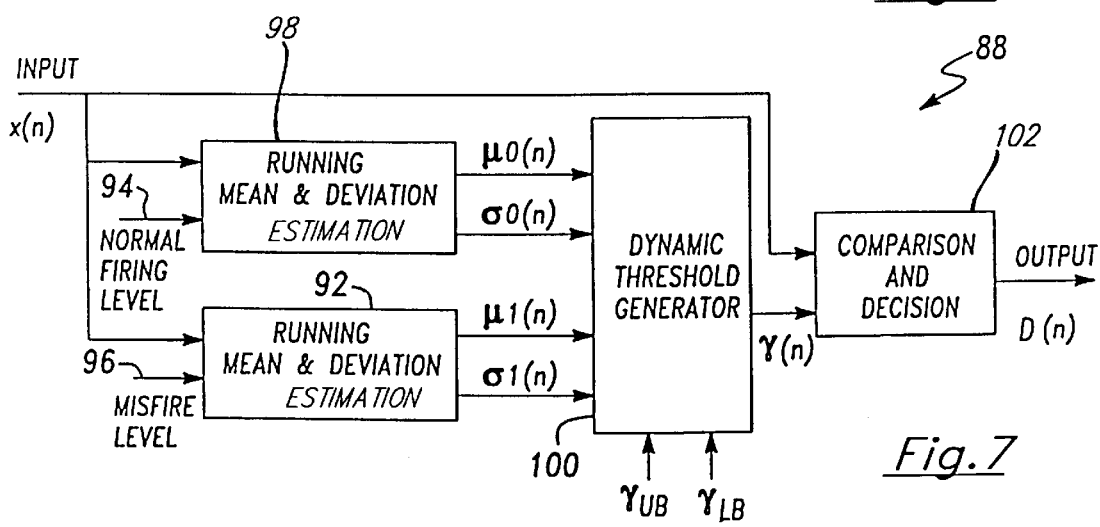
FIG. 7 is a detailed block diagram of the dynamic threshold and decision block shown in FIG. 3.

The dynamic threshold and decision block 88 is shown in more detail in FIG. 7. The block estimates normal and misfire signature statistical information and generates a dynamic threshold for misfire detection decision making purposes. The input signal x(n) is input from the cube law processing block 86 to running mean and deviation estimator 98, 92. The running mean and deviation estimator 98 also includes a normal firing level signal input 94, while the running mean and deviation estimator 92 includes a misfire level signal input 96. The estimator 98 has the input signal from inputs x(n) and outputs an estimate of the mean and deviation of the normal firing signature $\mu_o(n)$ and $\sigma_o(n)$ while the filter 92 outputs an estimate of the mean and deviation of the misfire signature $\mu_1(n)$ and $\sigma_0(n)$.

Figure 8:
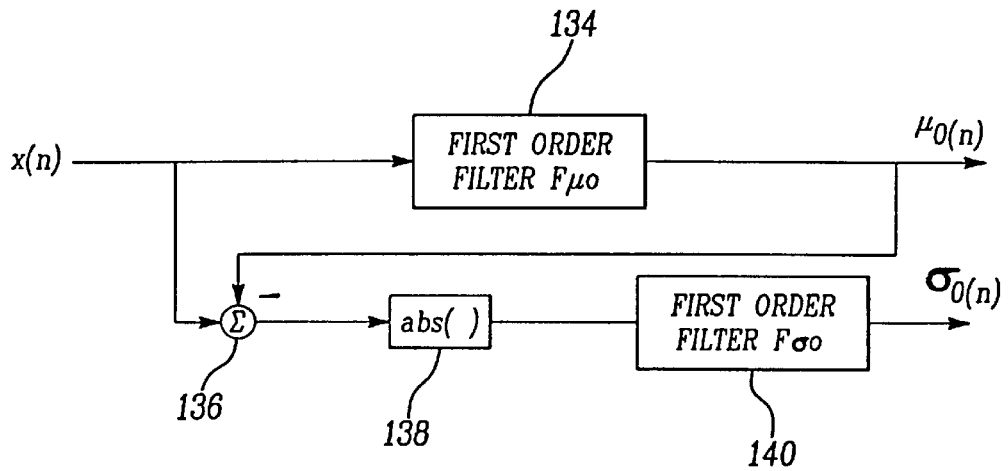
FIG. 8 is a block diagram showing a running mean and deviation estimator for normal firing signal of FIG. 7 in more detail.
Figure 9:
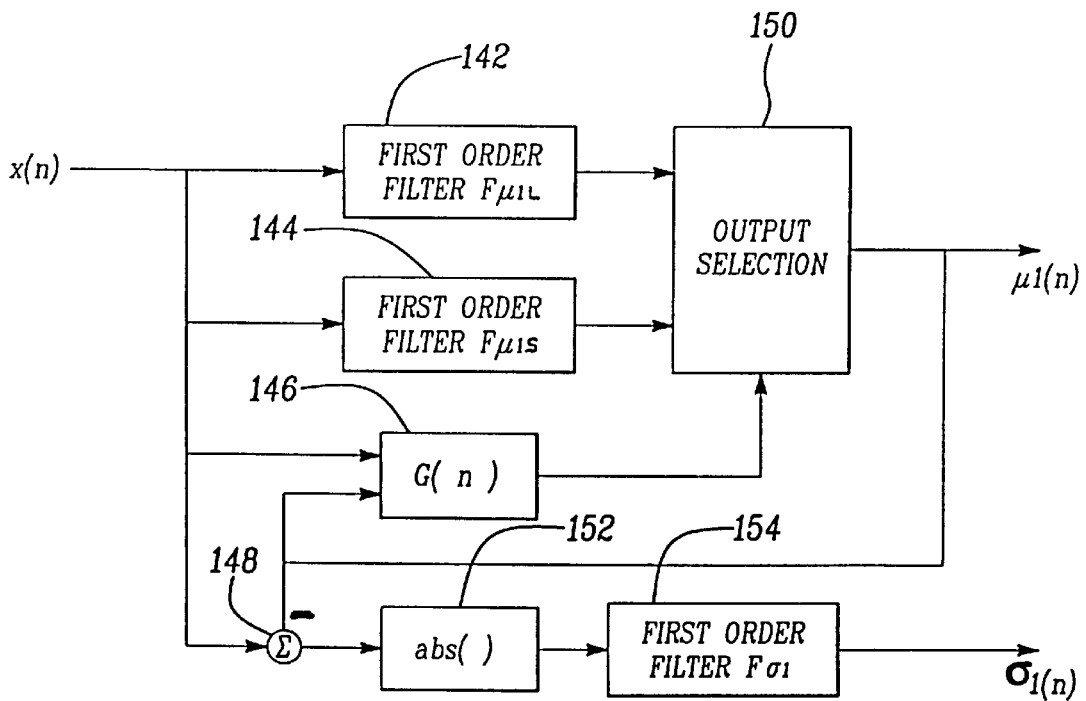
FIG. 9 is a block diagram showing a running mean and deviation estimator for misfire signal of FIG. 7 in more detail.

More particularly, referring to FIG. 8, the running mean and deviation estimator 90 is shown in more detail. The input signal x(n) is input into a first order filter 134 to generate an estimate of the mean of normal firing signal. After the input signal x(n) is subtract the estimated mean at the block 136, it is input into the absoluting block 138 where it is maintained or converted, if necessary, to a positive value. From the absoluting block 138, the input signal x(n) is input into a first order filter 140 to generate an estimate of the deviation of normal firing signal. The first order filters 134 and 140 can be written into the general difference equation:

$$y(n)=h_1 y(n-1)+h_0 u(n); \tag{1}$$

where u(n) is the input of the filter and $h_0$ and $h_1$ are the filter coefficients. Note that the running mean and deviation estimator 98 operates conditionally based on the normal firing level 94. That is, the mean and deviation estimates are updated only when the input signal x(n) is above the normal firing level. Referring now to FIG. 9, the running mean and deviation estimator 92 is shown in more detail. The input signal x(u) is input into a first order filter 142, another first order filter 144, and a comparator block 146.

After the input signal x(u) is filtered at the first order filters 142 and 144, it is input into an output selection block 150 where the output G(n) from the comparator block 146 is used to decide which output from the two filters 142 and 144 will be used for the running mean estimate $\mu_1(n)$. The output of the output selection block 150 is then substract by the input signal x(n) at the summation block 148 for use in determinations of deviation of misfire signal.

The output signal of the summation block 148 is then input into an absoluting block 152 where it is maintained or converted, if necessary, to a positive value. From the absoluting block 152 the signal is input into a first order filter 154 to generate an estimate of the deviation of misfire signal. The first order filters 142, 144 and 154 can be written as equation (1) above. Preferably, the first order filters 142 and 144 are running mean estimation filters with different parameters to satisfy the requirement for the different time responses in the running mean estimation $\mu_1(n)$ while the output of the first order filter 154 gives an absolute deviation estimate for deviation $\delta_1(n)$. It is also noted that the mean and deviation estimator 92 operates conditionally based on the misfire level 96. That is, the mean and deviation estimates are updated only when the input signal x(n) is below the misfire level.

Referring again to FIG. 7, the block 88 also includes a dynamic threshold generator 100, which updates the dynamic threshold γ at discrete time interval n based on the mean and deviation estimates for both the normal and misfire signature signals. Preferably, the threshold is defined between upper and lower boundaries $\gamma_{UB}(n)$ and $\gamma_{LB}(n)$. The dynamic threshold generator outputs the dynamic threshold value to a comparison and decision block 102, which also has as an input the input signal x(n). The comparison and decision block 102 determines if the input x(n) is less than γ(n). If so, the comparison and decision block outputs a "one" for misfire, or a "zero" for normal firing if x(n) is greater than or equal to γ(n). It should also be known that the output D(n) from comparison and decision block 102 may be fed back to the running mean and deviation estimator 92 as part of the misfire level input 96 (see FIG. 7).

Figure 10:
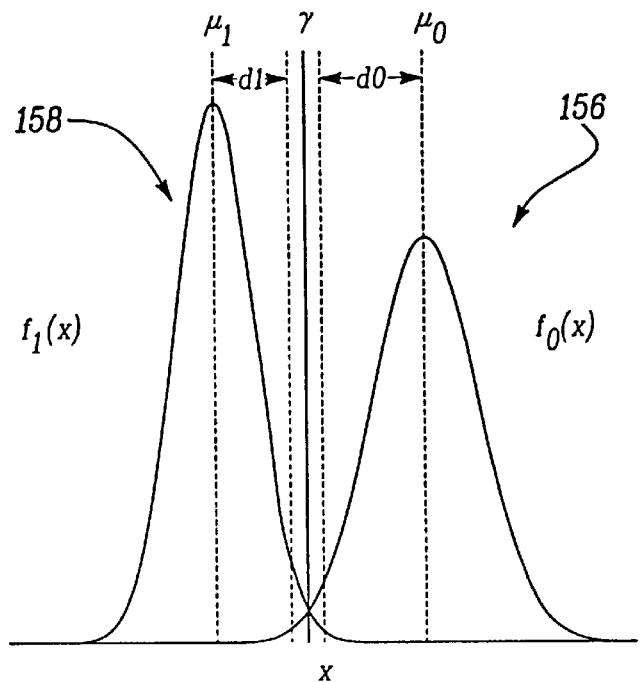
FIG. 10 is a graph illustrating a threshold that separates the misfire signal and normal firing signals given the probability density functions of FIG. 7.
Figure 11:
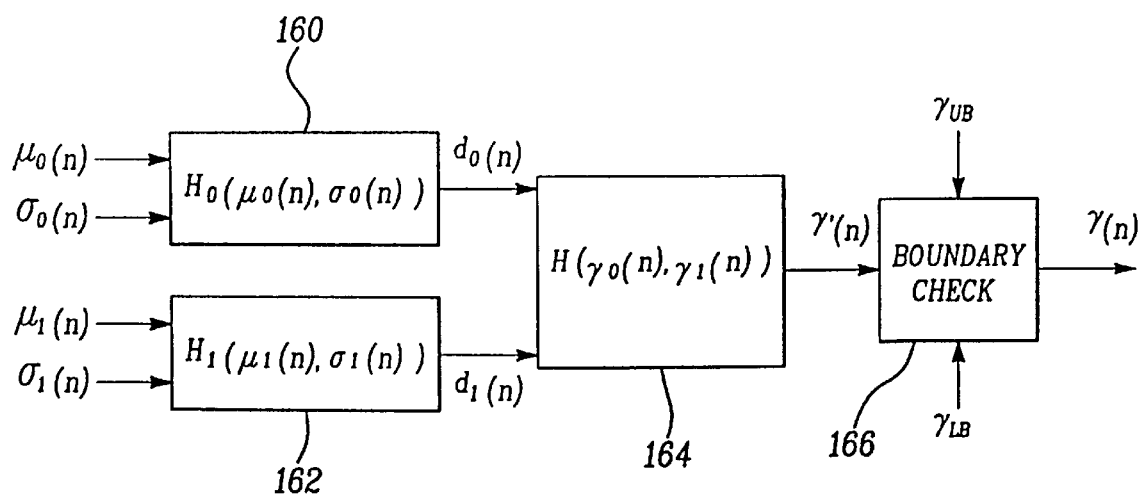
FIG. 11 is a block diagram showing the dynamic threshold generator of FIG. 7 in more detail.
Figure 12A:
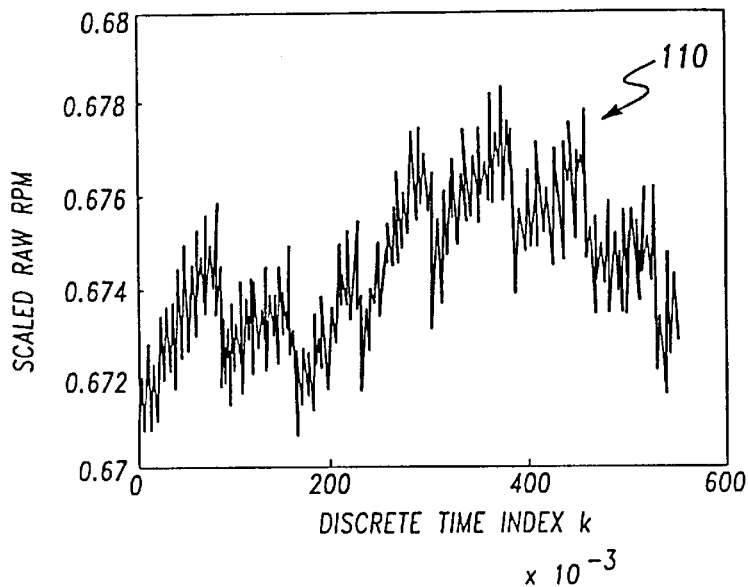
FIGS. 12A–12D are graphs illustrating the effects of the signal preprocessing block shown in FIG. 3 on the sensed crankshaft signal and MAP signal for a first set of engine operation condition and misfire pattern.
Figure 12B:
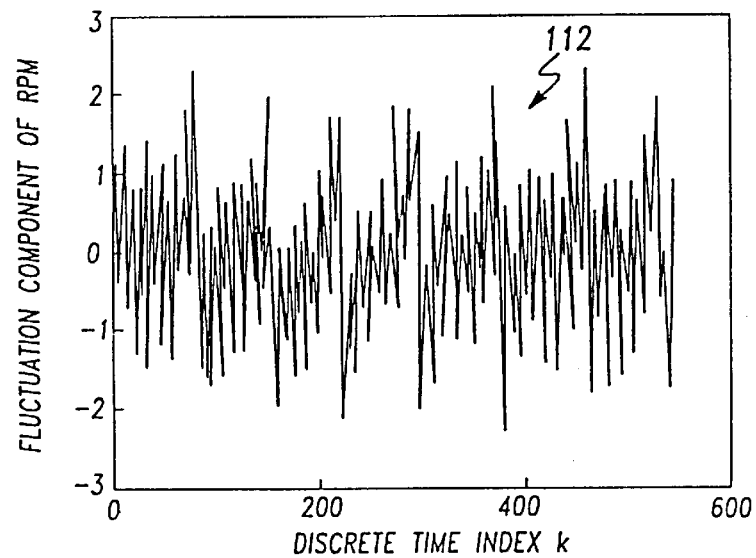
Figure 12C:
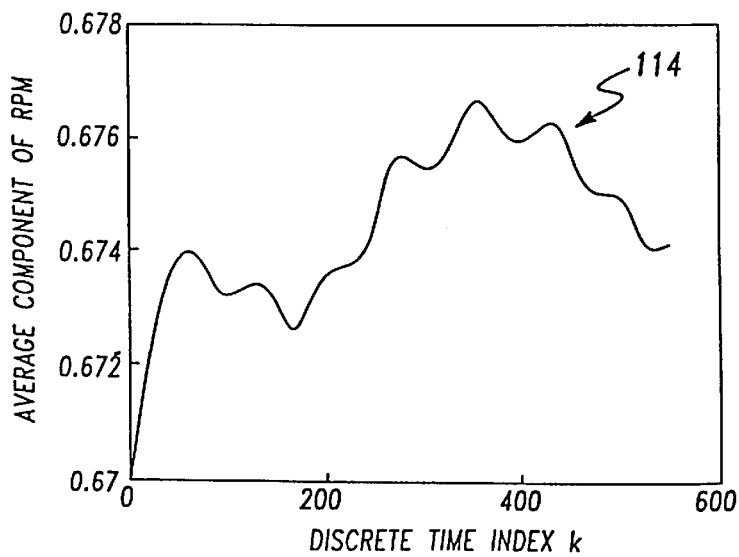
Figure 12D:
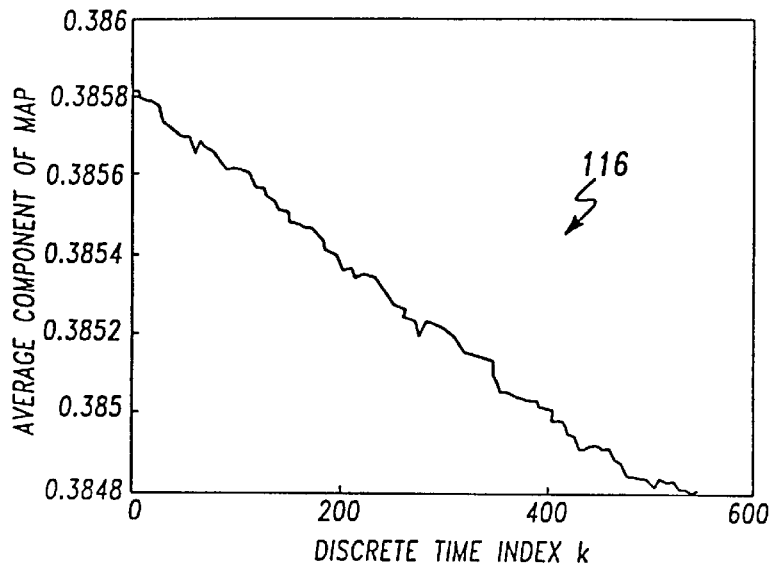
Figure 13:
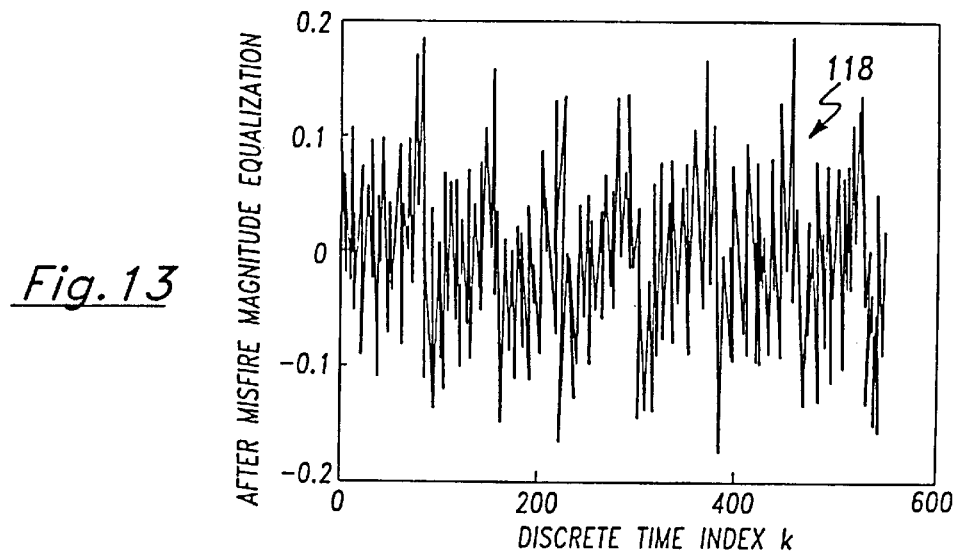
FIG. 13 is a graph illustrating the effects of the misfire magnitude equalization block shown in FIG. 3 on the sensed crankshaft signal.

Turning now to FIGS. 10 and 11, the dynamic threshold generator 100 will be described in greater detail. Engine misfire detection is a binary decision problem that decides whether a misfire has occurred or not. If a signal for the decision has perfect separation between the values representing misfire and normal firing, for example, all the values representing misfire are "1" and all the values representing normal firing are "0", then the decision becomes very easy and a fixed threshold which has a value between "0" and "1" can be chosen. In practice however, the signal is not so perfect. The values representing misfire and normal firing are spread into two groups usually clustered together with a probability distribution as illustrated in FIG. 10. The probability density functions $f_0(x)$ and $f_1(x)$ shown in FIG. 10 correspond to the normal firing 156 and misfire 158, respectively. In general, the probability density functions are difficult to know but their statistical parameters can be estimated with a current normal or misfire value and its previous values at time steps.

The threshold determination is made by first calculating the running mean $\mu_x(n)$ and deviation $\sigma_x(n)$ for two signatures (the "statistical parameters"), based on the current and previous data of the signal, as discussed above, where x denotes 0 or 1. Secondly, two deviation ranges d0 from $\mu_0$ and d1 from $\mu_1$, as illustrated in FIG. 10 are calculated as follows:

$$d_0(n)=H_0(\mu_0(n),\sigma_0(n))=\mu_0(n)-N_0(\sigma_0)\sigma_0(n)$$

$$d_1(n)=H_1(\mu_1(n),\sigma_1(n))=\mu_1(n)+N_1(\sigma_1)\sigma_1(n) \tag{2}$$

where $N_0(\sigma_0(n))$ and $N_1(\sigma_1(n))$ are determined with a predetermined criterion or from calibration data. For simplicity in a real implementation, $N_0(\sigma_0(n))$ and $N_1(\sigma_1(n))$ are usually chosen to be two constant values. Finally, the threshold γ is chosen between $d_0$ and $d_1$ as shown below:

$$\gamma(n)=H(d_0(n),d_1(n))=\alpha d_1(n)+(1-\alpha)d_0(n) \tag{3}$$

where α is determined with a predetermined criterion or from calibration data. As such, the threshold γ0 updated at each time step. It should be noted that if the probability density functions $f_0(x)$ and $f_1(x)$ are known, it is possible to derive a threshold directly from $\mu_0(n)$, $\sigma_0(n)$, $\mu_1(n)$ and $\sigma_1(n)$ using an optimal decision rule according to known criterion.

FIG. 11 illustrates a block diagram of the dynamic threshold generator 100 described above. The outputs $\mu_0(n)$ and $\sigma_0(n)$ from the running mean and deviation filter 98 are input into block 160 while the outputs $\mu_1(n)$ and $\sigma_1(n)$ from the running mean and deviation filter 92 are input into block 162. The blocks 160 and 162 determine the deviation ranges $d_0(n)$ and $d_1(n)$ according to equations (2) above. The ranges $d_0(n)$ and $d_1(n)$ from blocks 16D and 162 are input into threshold generator 164 where equation (3) above is performed. After the threshold γ(n) is determined at threshold generator 164, it is input into boundary check block 166 (i.e., threshold limiter) to ensure that the threshold γ(n) is between upper and lower boundaries $\gamma_{UB}(n)$ and $\gamma_{LB}(n)$. The output γ(n) is input into the comparison and decision block 102 for determining if the input x(n) is less than γ(n) or not as described above.

Referring to FIGS. 12 to 19, the effect that each of the blocks shown in FIG. 3 has on crankshaft signal processing is graphically illustrated for a 16% random misfire mode with 5500 RPM and 300 Torr of MAP. Referring first to FIGS. 12A to 12D, the so-called raw engine RPM signal is shown subsequent to being processed by the signal preprocessing block 74, in FIG. 12A at 110. In the misfire magnitude equalization block 76, the RPM signal is separated into its fluctuation component Ñ(k), as shown in FIG. 12B at 112, and its average RPM component $\overline{N}(k)$, as shown at 114 in FIG. 12. Also, the average map component is extracted by the block, as shown at 116 in FIG. 12D. These separate components of the signals are processed in the misfire magnitude equalization block, and the output signal Ne(k) is shown at 118 in FIG. 13.

Figure 14:
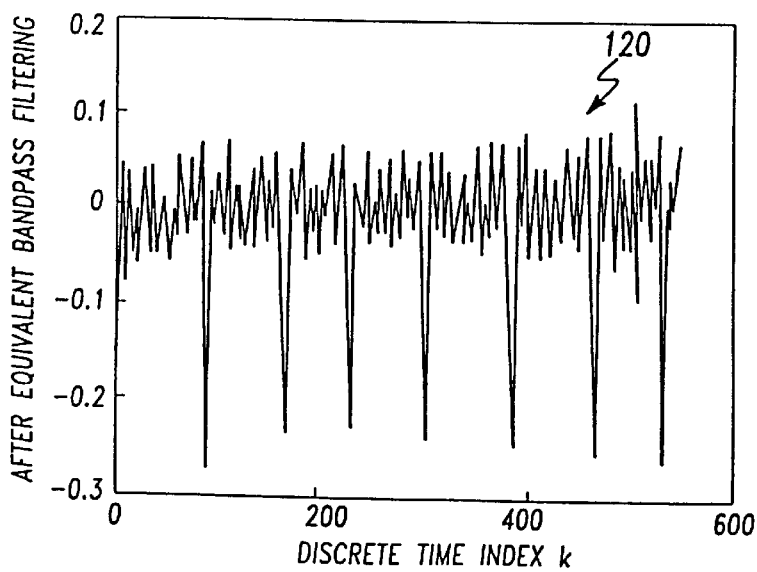
FIG. 14 is a graph illustrating the effects of the bandpass filtering block shown in FIG. 3 on the sensed crankshaft signal.
Figure 15:
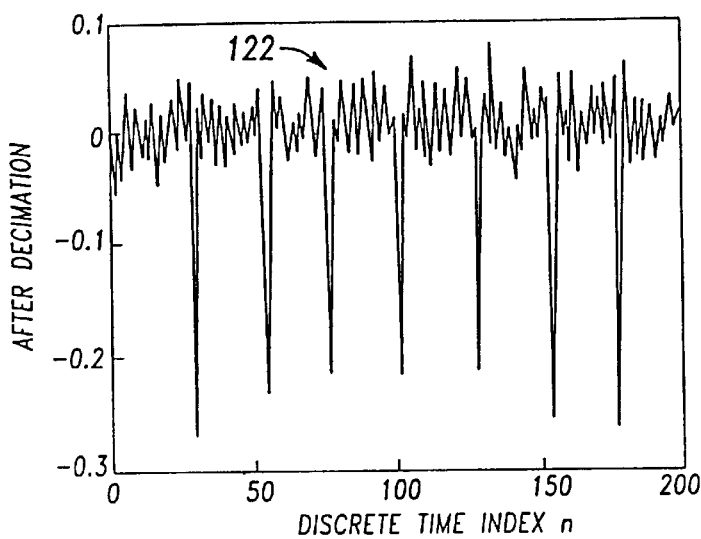
FIG. 15 is a graph illustrating the effects of the decimation block shown in FIG. 3 on the sensed crankshaft signal.
Figure 16:
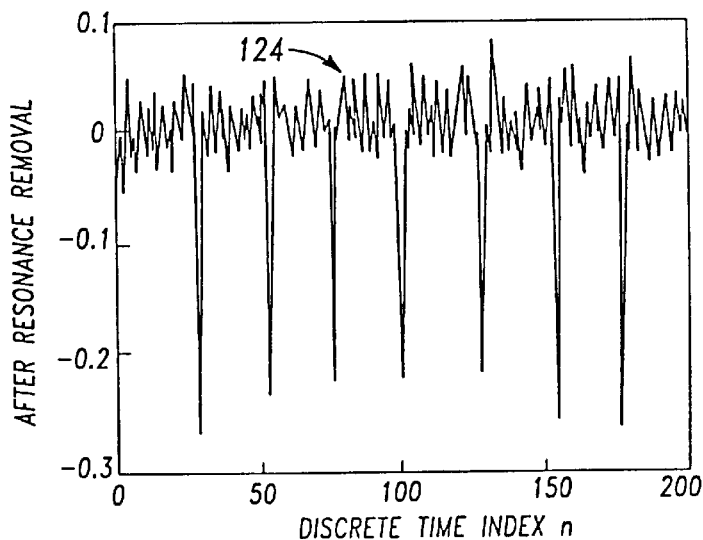
FIG. 16 is a graph illustrating the effects of the resonance removal block shown in FIG. 3 on the sensed crankshaft signal.
Figure 17:
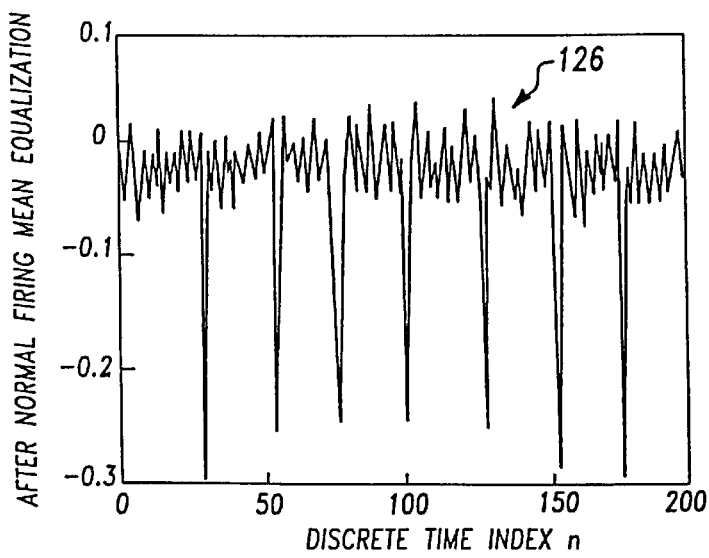
FIG. 17 is a graph illustrating the effects of the normal firing main equalization block shown in FIG. 3 on the sensed crankshaft signal.
Figure 18:
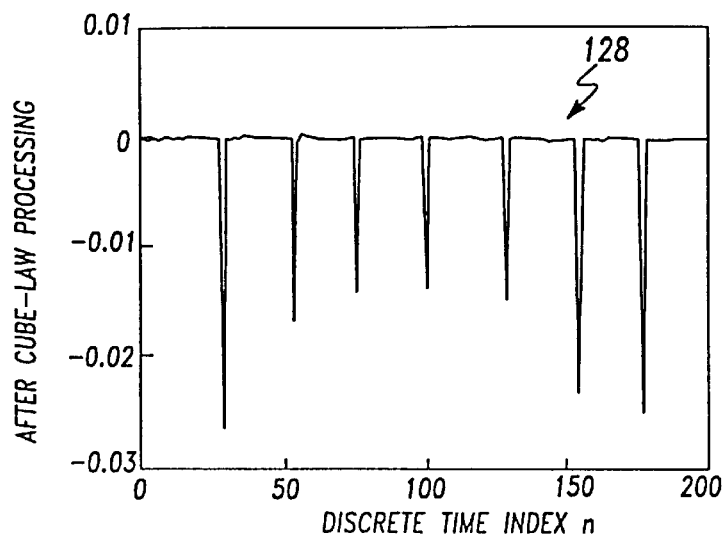
FIG. 18 is a graph illustrating the effects of the cube-law processing block shown in FIG. 3 on the sensed crankshaft signal.
Figure 19:
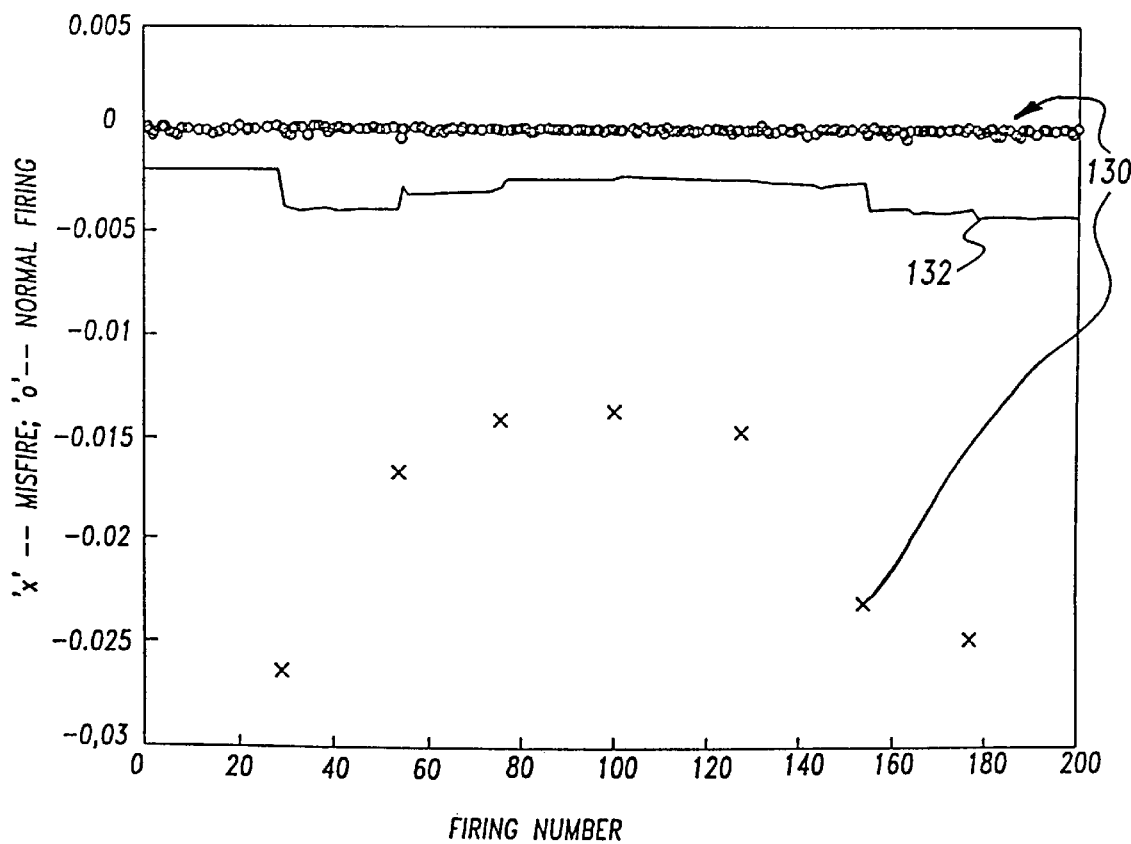
FIG. 19 is a graph illustrating the processed normal firing and misfire data points together with the dynamic threshold generated from the dynamic threshold and decision block shown in FIG. 3 for determining the occurrence of engine misfire.
Figure 20A:
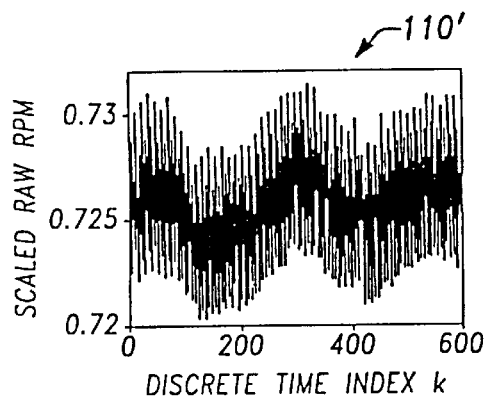
FIGS. 20–27 are graphs corresponding to FIGS. 12–19, respectively, for a second set of engine operation condition and misfire pattern.
Figure 20B:
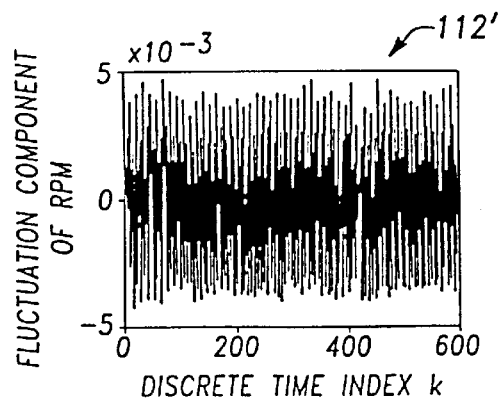
Figure 20C:
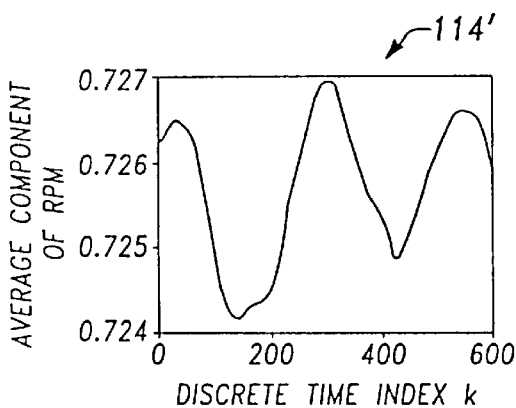
Figure 20D:
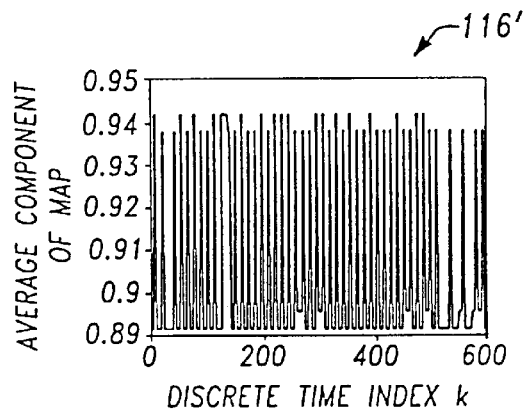
Figure 21:
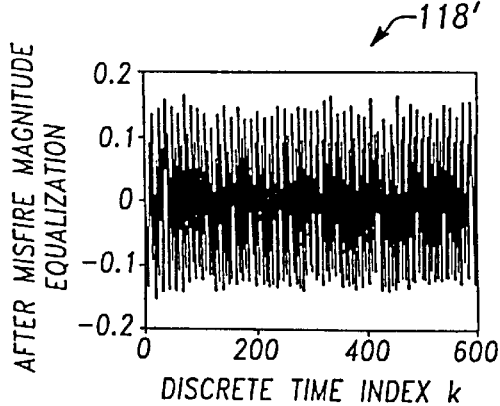
Figure 22:
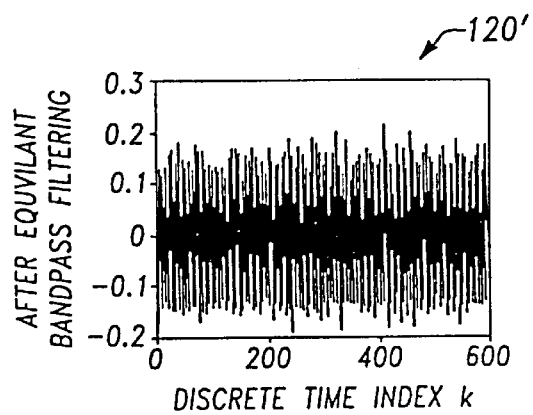
Figure 23:
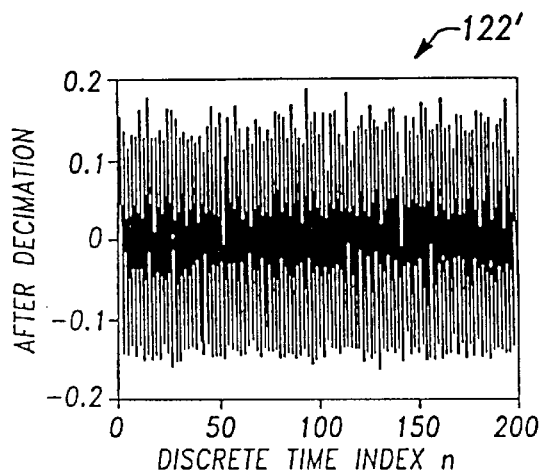
Figure 24:
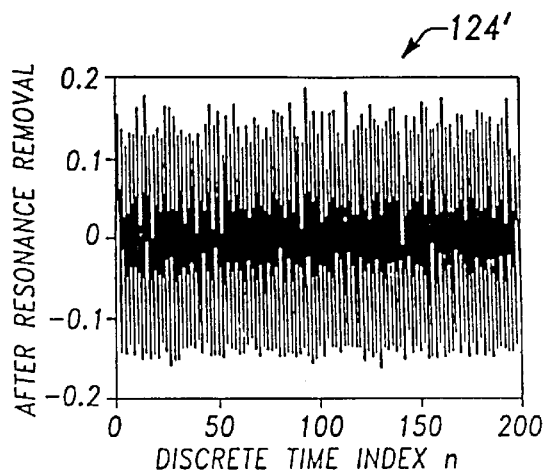
Figure 25:
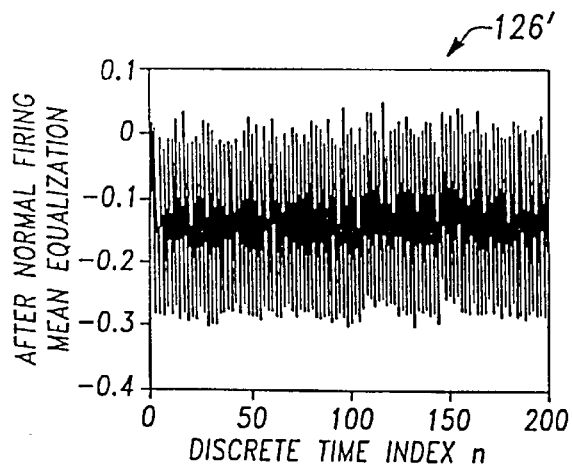
Figure 26:
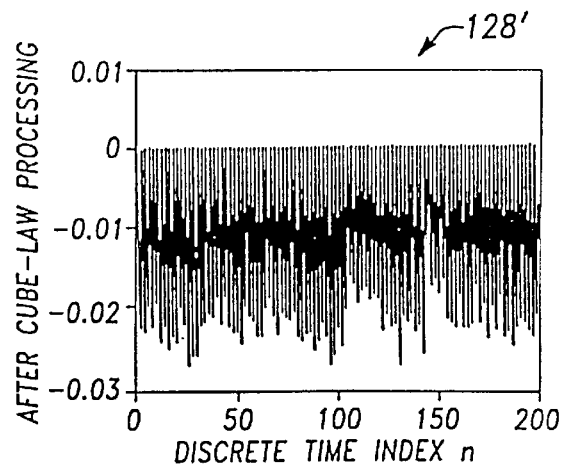
Figure 27:
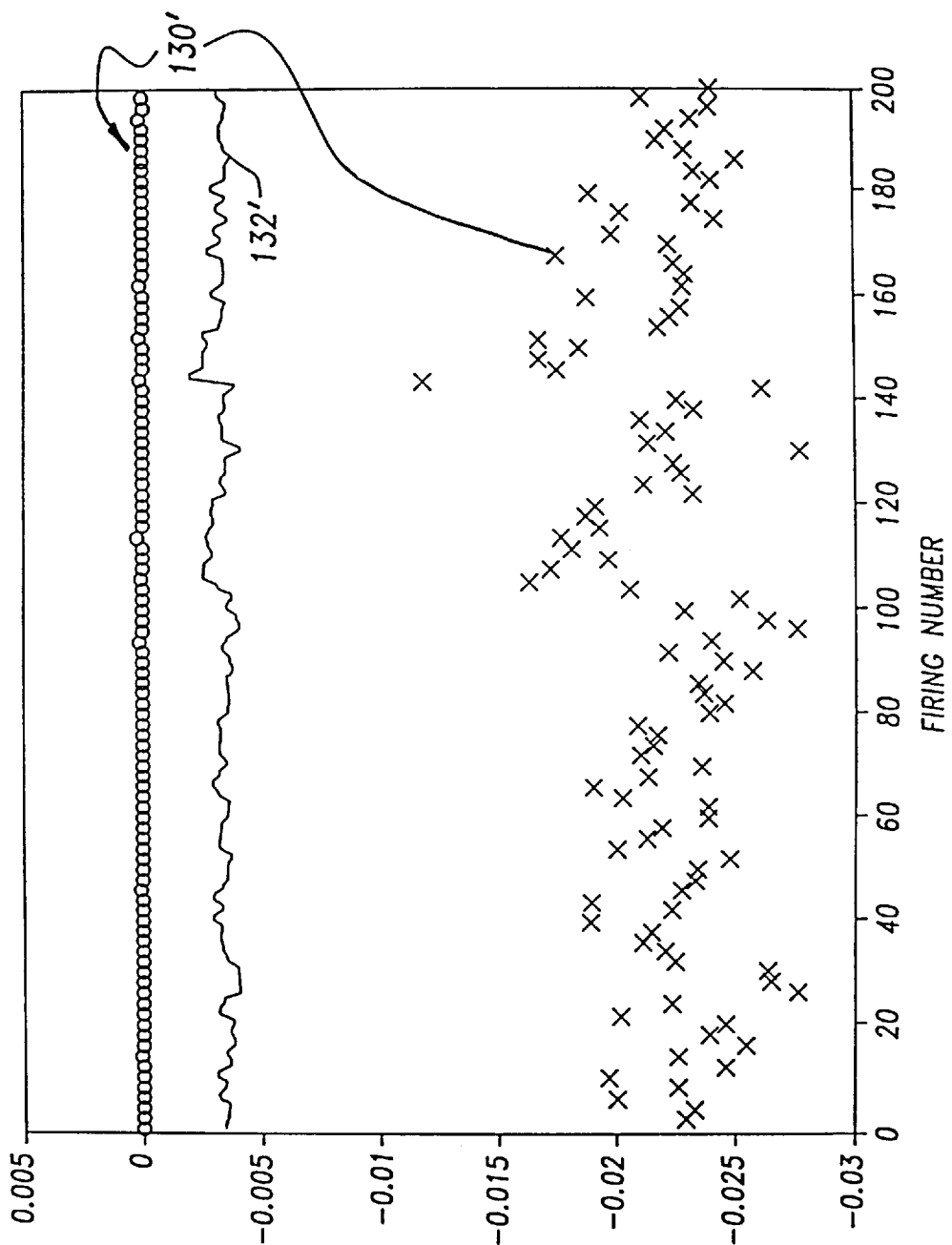

The signal Ne(k) is then input into the equivalent band pass filtering block 78 and, after being filtered, the signal shown at 120 in FIG. 14 is provided. This filtered signal is then input into the decimation block 80 where the data points in the signal are downsampled, as shown at 122 in FIG. 15. The decimated signal is then input into the resonance removal block 82, where resonance noise is removed from the signal, resulting in the signal shown at 124 in FIG. 16. The signal is then equalized by the normal firing mean equalization block 84, as shown at 126 in FIG. 17, before being cubed and filtered by the cube law processing block 86, resulting in the cubed signal shown at 128 in FIG. 18. The cubed and filtered signal is output from the block 86 and into the dynamic threshold and decision block 88. The signal input into the block 88 is represented graphically with data points "X" or "O" at 130, where "X" indicates misfire in FIG. 19, and "O" indicates normal fire. The dynamic threshold at 132 is used in the decision block 88 to determine whether or not an engine misfire has occurred, and the decision results are transmitted to the misfire indication block 90.

Referring now to FIGS. 20 to 27, the effect each of the blocks shown in FIG. 3 has on crankshaft signal processing is graphically illustrated for a multiple cylinder #1 and #4 100% continuous misfire mode at 6000 RPM and 720 Torr of MAP for four cylinder engine misfire detection. The graphed results shown at 110' to 132' in FIGS. 20 to 27 correspond to the graphed results shown at 110 to 132 in FIGS. 12 to 19 and the above description of the methodology described in connection with FIGS. 8–15.

As should be appreciated from the foregoing description, the medium data rate misfire detection system of the present invention represents a highly accurate technique of detecting engine misfire. The system of the present invention, while being highly accurate, minimizes the computational complexity associated with detecting engine misfire, and thus minimizes the cost of realizing the system. The system is thus capable of being installed on a large scale basis in motor vehicles through use of existing on board automotive micro controller technology.

While the above detailed description describes the preferred embodiment of the present invention, the invention is susceptible to modification, variation and alteration without deviating from the scope and fair meaning of the subjoined claims.

What is claimed is:

1. A motor vehicle internal combustion engine misfire detection system, comprising:
    a crankshaft velocity sensor that senses velocity of a vehicle crankshaft based on medium data rate crankshaft sampling and that generates a corresponding engine speed signal;
    a manifold pressure sensor that senses manifold absolute pressure (MAP) and generates a corresponding manifold absolute pressure signal;
    a signal processor that extracts average and fluctuation signal components from said engine speed and MAP signals for detecting both engine normal fire and misfire cylinder firing events;
    a decimator that, for a medium data sampling rate with M points sampled per cylinder firing event, where M is a positive integer greater than one, maps every M points into one mapped data point for misfire detection processing;
    a dynamic decision sub-system that determines, from said mapped data points, if said signal represents an engine misfire cylinder firing event or an engine normal fire cylinder firing event and that generates an output signal indicative thereof, said dynamic decision subsystem comprising a running mean estimator that generates a mean output of said normal and misfire cylinder firing events, and a running deviation estimator that generates a deviation output of said normal and misfire cylinder firing events; and
    a dynamic threshold generator that updates the dynamic threshold of said subsystem based on outputs of said running mean and deviation estimators.

2. The system of claim 1 wherein said a running mean estimator that generates a mean output of said normal cylinder firing events further comprises a first mean estimation filter while the running mean estimator that generates a mean output of said misfire cylinder firing events further comprises a second mean estimation filter having a first set of parameters and a third mean estimation filter having a second set of parameters.

3. The system of claim 2 further comprising an output selector for selecting an output of one of said second and third mean estimation filters as said mean output of said misfire cylinder firing event.

4. The system of claim 1 wherein said dynamic threshold generator further comprises:
    a range selector for determining a range for both normal and misfire cylinder firing events based on said outputs of said mean and deviation filters; and
    a threshold generator for selecting a value between said range for normal cylinder firing events and said range for misfire cylinder firing events as said dynamic threshold.

5. The system of claim 4 further comprising a threshold limiter for maintaining said value generated by said threshold generator within predetermined upper and lower boundaries.

6. A method of detecting misfire in an internal combustion engine comprising the steps of:
    generating a data signal containing a plurality of groups of sampled data points, each of said plurality of groups of sampled data points representing a sampled crankshaft angular velocity for a particular cylinder firing event;
    conditioning the data signal for misfire detection processing;
    mapping each group of said plurality of groups of sampled data points into a single mapped data point;
    generating a misfire detection dynamic threshold;
    feeding said mapped data points into running mean and deviation estimators and estimating mean and deviation values of said mapped sampled data points for both normal cylinder firing events and misfire cylinder firing events;
    updating said dynamic threshold based on said estimated mean and deviation values within predetermined upper and lower boundaries;
    determining if values of said mapped sampled data points fall below or above said dynamic threshold; and
    outputting a misfire detection signal if said mapped data points fall below said dynamic threshold.

7. The method of claim 6 wherein said step of estimating mean and deviation values of said mapped sampled data points for normal firing events further comprises feeding said mapped data points into a running mean and deviation estimator while said step of estimating mean and deviation values of said mapped sampled data points for misfire firing events further comprises feeding said mapped data points into a second running means and deviation estimator.

8. The method of claim 7 wherein said step of estimating mean and deviation values of said mapped sampled data points for misfire firing events further comprises selecting an output of one of said first and second running mean estimation filters as said estimated mean value for said misfire cylinder firing events.

9. The method of claim 6 wherein said step of generating a misfire detection dynamic threshold further comprises determining a first deviation range of values representing normal firing events calculated from said estimated mean and deviation values for normal cylinder firing events;

determining a second deviation range of values representing misfire firing events calculated from said estimated mean and deviation values for misfire cylinder firing events; and selecting a value between said first and second deviation ranges of values as said dynamic threshold.

10. The method of claim 9 further comprising the step of updating said value between said first and second ranges as said first and second ranges fluctuate with changing values of said estimated mean and deviation values.

11. The method of claim 6 wherein said step of updating said dynamic threshold further comprises continuously change said determined dynamic threshold with previous and current estimated mean and deviation values of said mapped sampled data points.

* * * * *